United States Patent
Yoon (10) Patent No.: US 8,046,663 B2
(45) Date of Patent: Oct. 25, 2011

(54) SEMICONDUCTOR MEMORY DEVICE AND METHOD FOR DRIVING THE SAME

(75) Inventor: Hyuck-Soo Yoon, Kyoungki-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 1152 days.

(21) Appl. No.: 11/819,814

(22) Filed: Jun. 29, 2007

(65) Prior Publication Data

US 2008/0168325 A1 Jul. 10, 2008

(30) Foreign Application Priority Data

Jan. 10, 2007 (KR) .................. 10-2007-0002894

(51) Int. Cl.
*H03M 13/00* (2006.01)
(52) U.S. Cl. .................... 714/758; 714/754; 714/807
(58) Field of Classification Search .................. 714/758, 714/754, 807, 704, 763, 768
See application file for complete search history.

(56) References Cited

U.S. PATENT DOCUMENTS

| | | | |
|---|---|---|---|
| 5,299,160 A | 3/1994 | Mori | |
| 6,816,416 B2 | 11/2004 | Won | |
| 7,043,672 B2 | 5/2006 | Merritt | |
| 7,478,374 B2 * | 1/2009 | Guilford | 717/140 |
| 7,681,043 B1 * | 3/2010 | Carr | 713/189 |
| 2001/0033514 A1 * | 10/2001 | Takata et al. | 365/189.07 |
| 2004/0243961 A1 | 12/2004 | Iadonato et al. | |
| 2005/0210457 A1 * | 9/2005 | Guilford | 717/140 |
| 2007/0204199 A1 * | 8/2007 | Chung et al. | 714/763 |

FOREIGN PATENT DOCUMENTS

| | | |
|---|---|---|
| JP | 2005-38526 | 2/2005 |
| JP | 2005-346758 | 12/2005 |
| KR | 1993-0003279 | 10/1993 |

OTHER PUBLICATIONS

Korean Office Action issued in Korean Patent Application No. KR 10-2007-0002894, dated on Feb. 27, 2008.

* cited by examiner

*Primary Examiner* — Fritz Alphonse
(74) *Attorney, Agent, or Firm* — IP & T Group LLP (57) ABSTRACT

A semiconductor memory device includes: a first bank and a second bank; one or more first data input/output pads disposed at one side of the first bank and used in access to data of the first bank; one or more second data input/output pads disposed at one side of the second bank and used in access to data of the second bank; a first cyclic redundancy code (CRC) generation circuit for generating a first CRC using a plurality of data output from the first bank and outputting the generated first CRC through the first data input/output pads; and a second CRC generation circuit for generating a second CRC using a plurality of data output from the second bank and outputting the generated second CRC through the second data input/output pads.

11 Claims, 5 Drawing Sheets

| FRAME | F0 | F1 | F2 | F3 | F4 | F5 | F6 | F7 | F8 | F9 | F10 | F11 | F12 | F13 | F14 | F15 | F16 | F17 |
|---|---|---|---|---|---|---|---|---|---|---|---|---|---|---|---|---|---|---|
| DQ0 | 0 | 1 | 2 | 3 | 4 | 5 | 6 | 7 | CRC_A | 32 | 33 | 34 | 35 | 36 | 37 | 38 | 39 | CRC_A |
| DQ1 | 8 | 9 | 10 | 11 | 12 | 13 | 14 | 15 | CRC_A | 40 | 41 | 42 | 43 | 44 | 45 | 46 | 47 | CRC_A |
|  |  |  |  |  |  |  |  |  |  |  |  |  |  |  |  |  |  |  |
| DQ2 | 16 | 17 | 18 | 19 | 20 | 21 | 22 | 23 | CRC_A | 48 | 49 | 50 | 51 | 52 | 53 | 54 | 55 | CRC_A |
| DQ3 | 24 | 25 | 26 | 27 | 28 | 29 | 30 | 31 | CRC_A | 56 | 57 | 58 | 59 | 60 | 61 | 62 | 63 | CRC_A |

| FRAME | F0 | F1 | F2 | F3 | F4 | F5 | F6 | F7 | F8 | F9 | F10 | F11 | F12 | F13 | F14 | F15 | F16 | F17 |
|-------|----|----|----|----|----|----|----|----|------|-----|-----|-----|-----|-----|-----|-----|-----|------|
| DQ0 | 0 | 1 | 2 | 3 | 4 | 5 | 6 | 7 | CRC_A | 32 | 33 | 34 | 35 | 36 | 37 | 38 | 39 | CRC_A |
| DQ1 | 8 | 9 | 10 | 11 | 12 | 13 | 14 | 15 | CRC_A | 40 | 41 | 42 | 43 | 44 | 45 | 46 | 47 | CRC_A |
| DQ2 | 16 | 17 | 18 | 19 | 20 | 21 | 22 | 23 | CRC_A | 48 | 49 | 50 | 51 | 52 | 53 | 54 | 55 | CRC_A |
| DQ3 | 24 | 25 | 26 | 27 | 28 | 29 | 30 | 31 | CRC_A | 56 | 57 | 58 | 59 | 60 | 61 | 62 | 63 | CRC_A |
| | | | | | | | | | | | | | | | | | | |
| DQ4 | 64 | 65 | 66 | 67 | 68 | 69 | 70 | 71 | CRC_B | 96 | 97 | 98 | 99 | 100 | 101 | 102 | 103 | CRC_B |
| DQ5 | 72 | 73 | 74 | 75 | 76 | 77 | 78 | 79 | CRC_B | 104 | 105 | 106 | 107 | 108 | 109 | 110 | 111 | CRC_B |
| DQ6 | 80 | 81 | 82 | 83 | 84 | 85 | 86 | 87 | CRC_B | 112 | 113 | 114 | 115 | 116 | 117 | 118 | 119 | CRC_B |
| DQ7 | 88 | 89 | 90 | 91 | 92 | 93 | 94 | 95 | CRC_B | 120 | 121 | 122 | 123 | 124 | 125 | 126 | 127 | CRC_B |

SEMICONDUCTOR MEMORY DEVICE AND METHOD FOR DRIVING THE SAME

CROSS-REFERENCE TO RELATED APPLICATIONS

The present invention claims priority of Korean patent application number 10-2007-0002894, filed on Jan. 10, 2007, which is incorporated by reference in its entirety.

BACKGROUND OF THE INVENTION

The present invention relates to a semiconductor integrated circuit, and more particularly, to a semiconductor memory device using a cyclic redundancy code (CRC) checking, and a method for driving the same.

A system is implemented with a plurality of semiconductor devices. Among them, a semiconductor memory device is used to store data. The semiconductor memory device outputs data corresponding to addresses received from a data processor, e.g., a central processing unit (CPU), or stores the data received from the data processor into unit cells corresponding to addresses input together with the data.

As the operating speed of the system is increasing, the data processor requires the semiconductor memory device to input/output data at a higher speed. As semiconductor integrated circuit (IC) technologies are rapidly developed, the operating speed of the data processor increases, but the data input/output speed of the semiconductor memory device does not keep up with the increased operating speed of the data processor.

Many attempts have been made to develop semiconductor memory devices that can increase data input/output speed up to the level required by the data processor. One of these semiconductor memory devices is a synchronous memory device that outputs data at each period of a system clock. Specifically, the synchronous memory device outputs or receives data to or from the data processor in synchronization with the system clock. However, because even the synchronous memory device could not keep up with the operating speed of the data processor, a double data rate (DDR) synchronous memory device was developed. The DDR synchronous memory device outputs or receives data at each transition of the system clock. That is, the DDR synchronous memory device outputs or receives data in synchronization with falling edges and rising edges of the system clock.

Meanwhile, in order to meet the required data processing speed of the data processor, the number of bits of inputted/outputted data in response to one-time data access command, i.e., a read command or a write command, is gradually increasing. That is, the number of inputted/outputted data in parallel during one-time data access operation is gradually increasing. For example, while 4-bit data have been inputted/outputted in response to the one-time data access command, the number of data is increased such that 8-bit or 16-bit data are inputted/outputted. In other words, the number of data processed by the one-time data access command is increased so as to meet the required data transfer speed of the system.

However, since the increase in the number of data processed by the one-time data access command causes a serious problem, it is very difficult to increase the number of data to more than a predetermined number. When the number of data inputted/outputted in response to the one-time data access command increases, the number of data input/output pads in the semiconductor memory device must increase. In addition, the number of data lines in the semiconductor memory device must increase as many as the increased number of the data input/output pads. Further, data lines between the semiconductor memory device and the data processor must also increase. The respective data lines are mutually influenced seriously when a plurality of data lines are arranged in parallel in such a state that data are transferred through the respective data lines at high speed. In some serious cases, data signals loaded on adjacent data lines are inverted and thus data are incorrectly changed.

As the operating speed of the semiconductor processor is further increased with the rapid advance of the semiconductor integrated circuit technology, even the data input/output speed of the DDR synchronous memory device may not meet the data input/output speed required by the semiconductor memory device. As described above, the required bandwidth of the system can be met by increasing the number of inputted/outputted data in parallel. However, since this method has already reached its limitation, a new semiconductor memory device and a method for driving the same are required.

As one approach to significantly increasing the operating speed of semiconductor memory devices, a variety of data transfer methods used in communication systems are applied to semiconductor memory devices. A typical method is to input/output data in series, not in parallel. As one example, after transferring data between the semiconductor memory device and the data processor, data error is checked using an error check code. The most typical method is a cyclic redundancy code (CRC) checking method. According to the CRC checking method, a check bit is generated using a predetermined number of data and then is output when the predetermined number of data are output. A device receiving the predetermined number of data compares the check bit with data so as to determine if the data is inputted normally. The CRC checking method makes it possible to input/output data at high speed. Therefore, when the data access command is inputted, it is unnecessary to increase the number of data processed in parallel so as to meet the required data transfer speed of the system.

Figure 1:
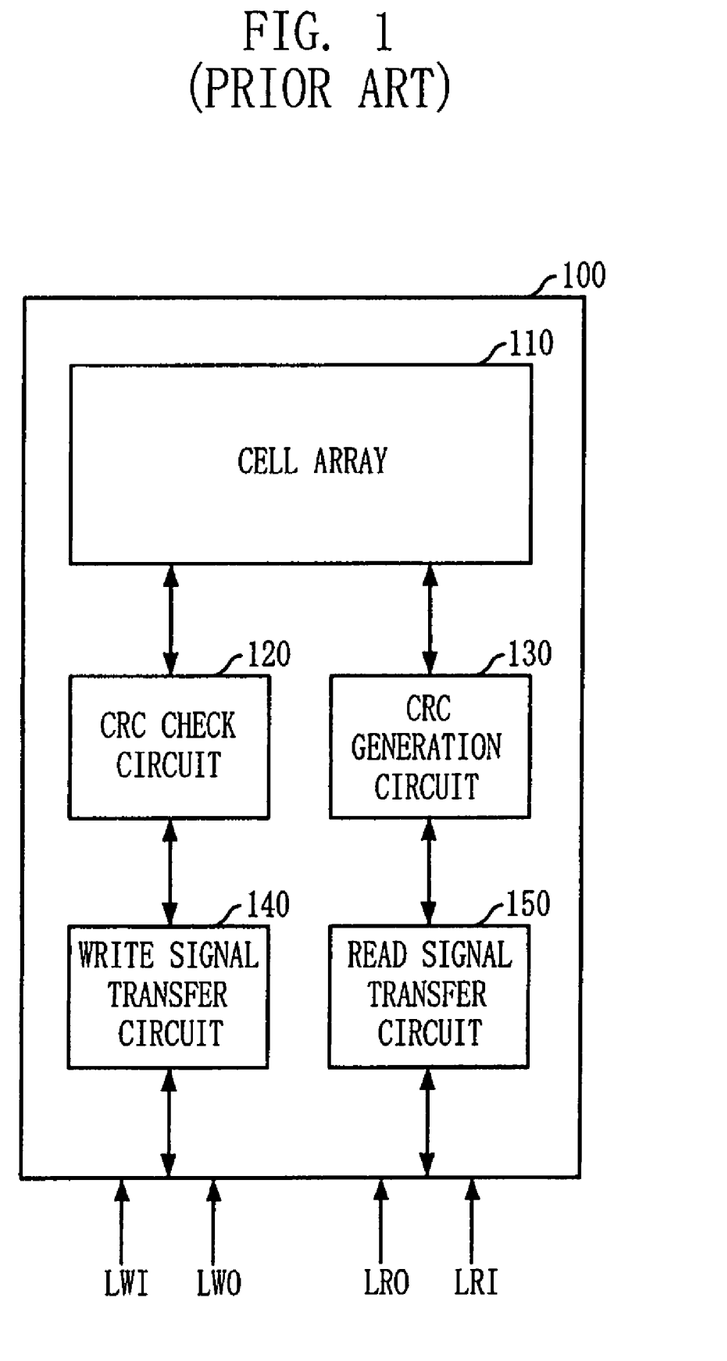
FIG. 1 is a block diagram of a conventional semiconductor memory device.

FIG. 1 is a block diagram of a conventional semiconductor memory device.

Referring to FIG. 1, the conventional semiconductor memory device 100 using a CRC checking method includes a cell array 110, a CRC check circuit 120, a CRC generation circuit 130, a write signal transfer circuit 140, and a read signal transfer circuit 150. During a write operation, the semiconductor memory device 100 receives a write command, a write data, and a write address through a write signal input port LWI. The CRC check circuit 120 uses a CRC to check if an error occurs in the inputted write data. When no error is found, the CRC check circuit 120 stores the write data according to a corresponding address. When the error is found, the CRC check circuit 120 requests a retransmission of the write data through a write signal output port LWO and again receives the write data. During a read operation, the semiconductor memory device 100 receives a read command and a read address through a read signal input port LRI. The semiconductor memory device 100 outputs data of the cell array corresponding to the read address through a read signal output port LRO. The CRC check circuit 130 generates a CRC code corresponding to the outputted data and outputs the CRC code when data are outputted in response to the read command. A data processor receiving the data from the semiconductor memory device compares the inputted CRC with the received data to check if an error exists in the received data. When the error exists, the CRC check circuit 120 requests the semiconductor memory device to output the data again. When no error exists, the semiconductor memory device performs an operation using the received data.

Using the CRC, the data can be inputted/outputted at high speed without increasing the number of data transfer paths in parallel between the semiconductor memory device and the data processor.

However, the operation of generating the CRC in the data transfer is added. Therefore, there is a need for a method for efficiently generating the CRC.

SUMMARY OF THE INVENTION

Embodiments of the present invention are directed to providing a semiconductor memory device with a minimum CRC generation circuit corresponding to a plurality of banks, and a method for driving the same.

In accordance with an aspect of the present invention, there is provided a semiconductor memory device, including: a first bank and a second bank; one or more first data input/output pads disposed at one side of the first bank and used in accessing to data of the first bank; one or more second data input/output pads disposed at one side of the second bank and used in accessing to data of the second bank; a first cyclic redundancy code (CRC) generation circuit for generating a first CRC using a plurality of data output from the first bank and outputting the generated first CRC through the first data input/output pads; and a second CRC generation circuit for generating a second CRC using a plurality of data output from the second bank and outputting the generated second CRC through the second data input/output pads.

In accordance with an aspect of the present invention, there is provided a method for driving a semiconductor memory device having a first bank and a second bank. Data of the first bank are accessed through one or more first data input/output pads disposed at one side of the first bank, and data of the second bank are accessed through one or more second data input/output pads disposed at one side of the second bank. The method includes: generating a first CRC using the first data provided from the first bank; generating a second CRC using the second data provided from the second bank; outputting the first data through the first data input/output pads in response to a data access command; outputting the first CRC through the first data input/output pads; outputting the second data through the second data input/output pads in response to the data access command; and outputting the second CRC through the second data input/output pads.

DESCRIPTION OF SPECIFIC EMBODIMENTS

Figure 2:
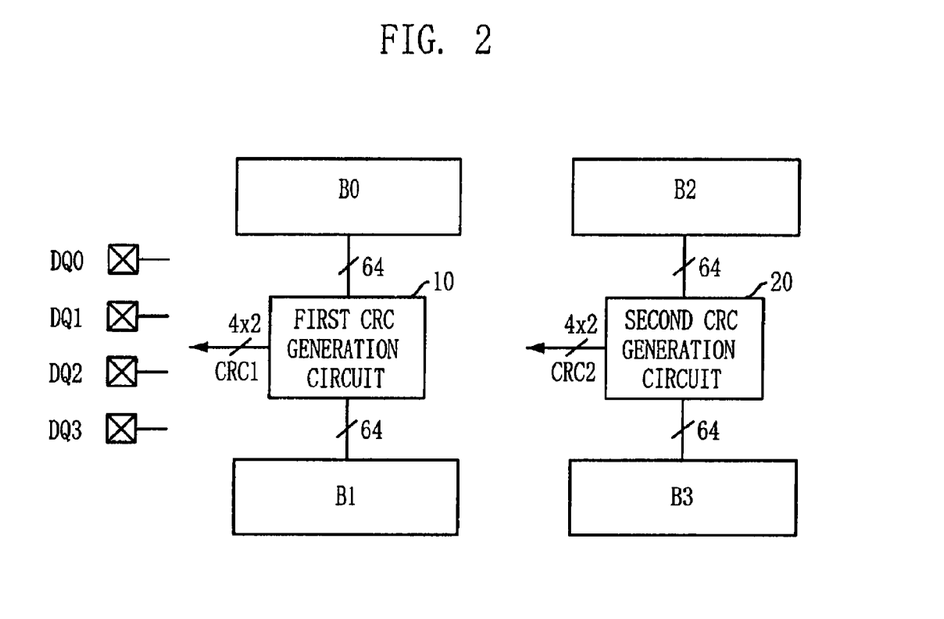
FIG. 2 is a block diagram of a semiconductor memory device operating in an X4 mode.

FIG. 2 is a block diagram of a semiconductor memory device operating in an X4 mode.

A semiconductor memory device shown in FIG. 2 operates in an X4 mode and uses a CRC. The semiconductor memory device includes first to fourth banks B0 to B3, first and second CRC generation circuits 10 and 20, and first to fourth data input/output pads DQ0 to DQ3. In the semiconductor memory device, the first to fourth data input/output pads DQ0 to DQ3 are provided for the X4 mode operation in which 4-bit data are input or output in response to one-time data access command. In order for the X4 mode operation, 64-bit data are outputted from the respective first to fourth banks B0 to B3 and 16-bit data are outputted through a single data input/output pad. For example, 64-bit data stored in the third bank B2 are outputted in groups of 16 bits through the first to fourth data input/output pads DQ0 to DQ3. It was assumed herein that the 16-bit data are continuously outputted through the single data input/output pad.

The first CRC generation circuit 10 is shared by the first and second banks B0 and B1, and the second CRC generation circuit 20 is shared by the third and fourth banks B2 and B3. The first CRC generation circuit 10 generates 8-bit CRC CRC1 using the 64-bit data transferred from the first bank B0 or the second bank B1 and outputs the 8-bit CRC CRC1 when the data is outputted.

Figure 3:
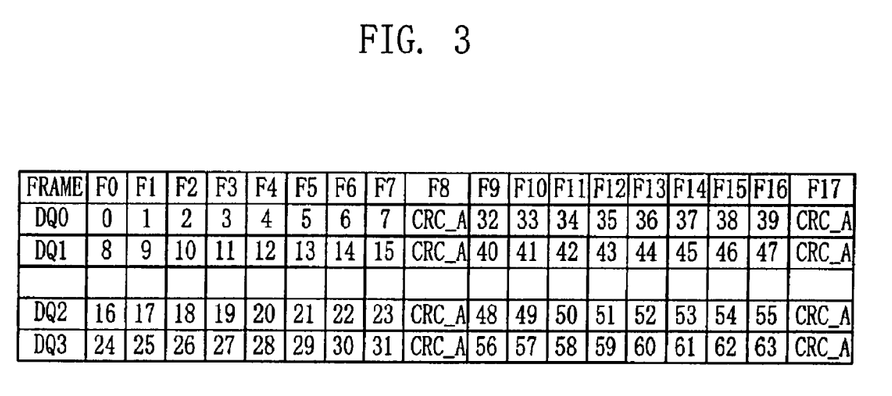
FIG. 3 is a diagram showing data patterns outputted from the semiconductor memory device of FIG. 2.

FIG. 3 is a diagram showing data patterns outputted from the semiconductor memory device of FIG. 2.

Specifically, FIG. 3 shows the 16-bit data output through the first to fourth data input/output pads DQ0 to DQ3. 4 bits of the 8-bit CRC generated by the first CRC generation circuit 10 are outputted after the 32-bit data are outputted. Then, the remaining 4-bit CRC are outputted after the remaining 32-bit data are outputted. In FIG. 3, "CRC_A" represents the 8-bit CRC generated by the CRC generation circuit.

Figure 4:
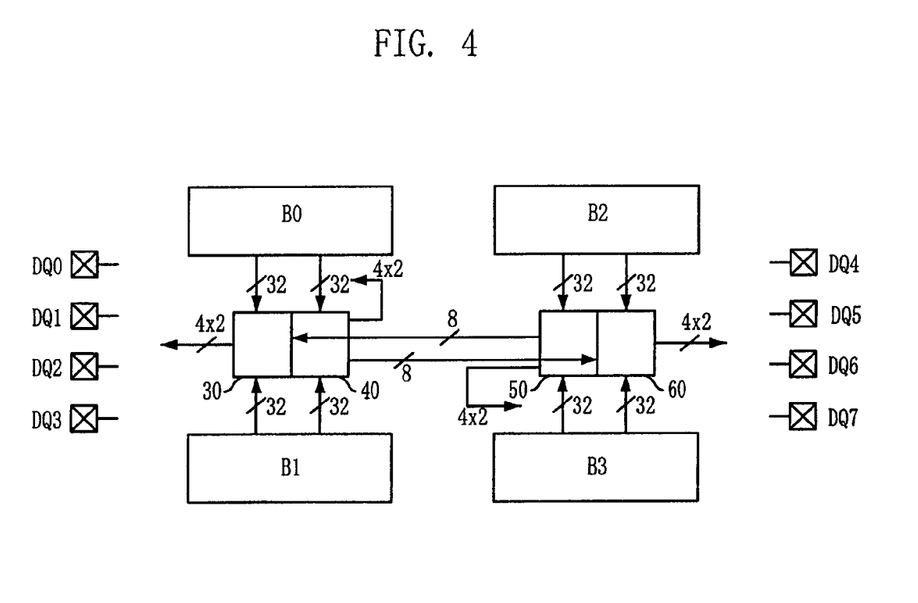
FIG. 4 is a block diagram of a semiconductor memory device operating in an X8 mode.

FIG. 4 is a block diagram of a semiconductor memory device operating in an X8 mode.

Referring to FIG. 4, the semiconductor memory device includes first to eighth data input/output pads DQ0 to DQ7 in order for the X8 mode operation in which 8-bit data are inputted/outputted in response to one-time data access command. The first to fourth data input/output pads DQ0 to DQ3 are disposed at one side of a region where the banks are arranged, and the fifth to eighth data input/output pads DQ4 to DQ7 are disposed at the other side of the region where the banks are arranged. The data input/output pads are disposed in such a way so as to adjust a transfer length, through which the data are transferred from each bank to the input/output pad, to a predetermined value when the data stored in the banks are outputted through the data input/output pads. In case of the X8 mode operation, two banks are operated together in response to the one-time data access command. For example, when the data access command is inputted, the first and third banks B0 and B2 are selected, 64-bit data from the first bank B0 are outputted in groups of 16 bits through the first to fourth data input/output pads DQ0 to DQ3, and 64-bit data from the third bank B2 are outputted in groups of 16 bits through the fifth to eighth data input/output pads DQ4 to DQ7. The semiconductor memory device includes first to fourth CRC generation circuits 30 to 60. The first and second CRC generation circuits 30 and 40 are shared by the first and second banks B0 and B1, and the third and fourth CRC generation circuits 50 and 60 are shared by the third and fourth banks B2 and B3. It was assumed herein that the 16-bit data are continuously outputted through the single data input/output pad.

Figure 5:
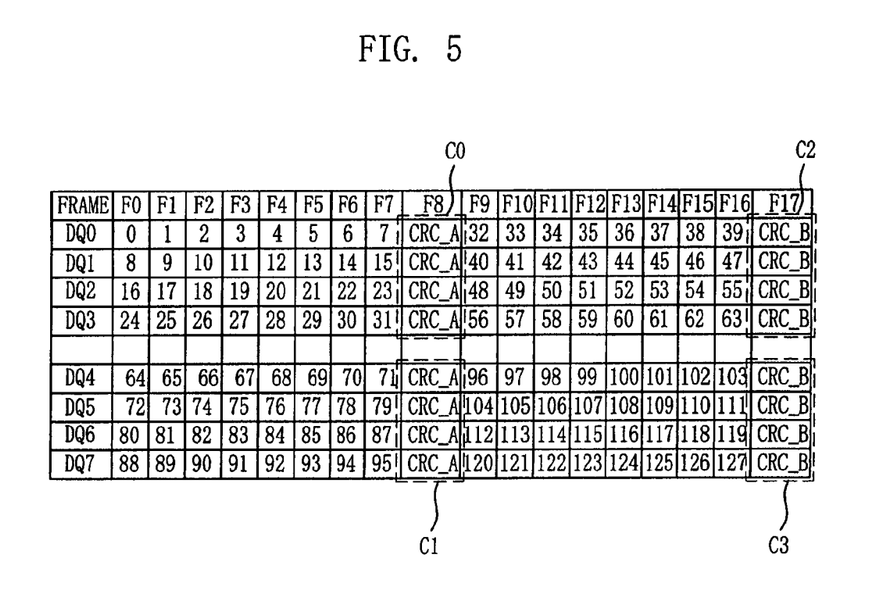
FIG. 5 is a diagram showing data patterns outputted from the semiconductor memory device of FIG. 4.

FIG. 5 is a diagram showing data patterns outputted from the semiconductor memory device of FIG. 4.

As shown in FIG. 5, assuming that the first and third banks B0 and B2 are selected, when the data access command is inputted, 64-bit data 0-63 from the first bank B0 are outputted through the first to fourth data input/output pads DQ0 to DQ3, and 64-bit data 64-127 from the third bank B2 are outputted through the fifth to eighth data input/output pads DQ4 to DQ7. After the data 0-31 are outputted, 4-bit CRC C0 of the 8-bit CRC CRC_A generated by the first and third CRC generation circuits 30 and 50 is outputted through the first to fourth data input/output pads DQ0 to DQ3. After the data 64-95 are outputted, the remaining 4-bit CRC C1 is outputted through the fifth to eighth data input/output pads DQ4 to DQ7.

In addition, after the data 32-63 are outputted, 4-bit CRC C2 of the 8-bit CRC CRC_B generated by the second and fourth CRC generation circuits 40 and 60 is outputted through the first to fourth data input/output pads DQ0 to DQ3. After the data 96-127 are outputted, the remaining 4-bit CRC C3 is outputted through the fifth to eighth data input/output pads DQ4 to DQ7.

Figure 6:
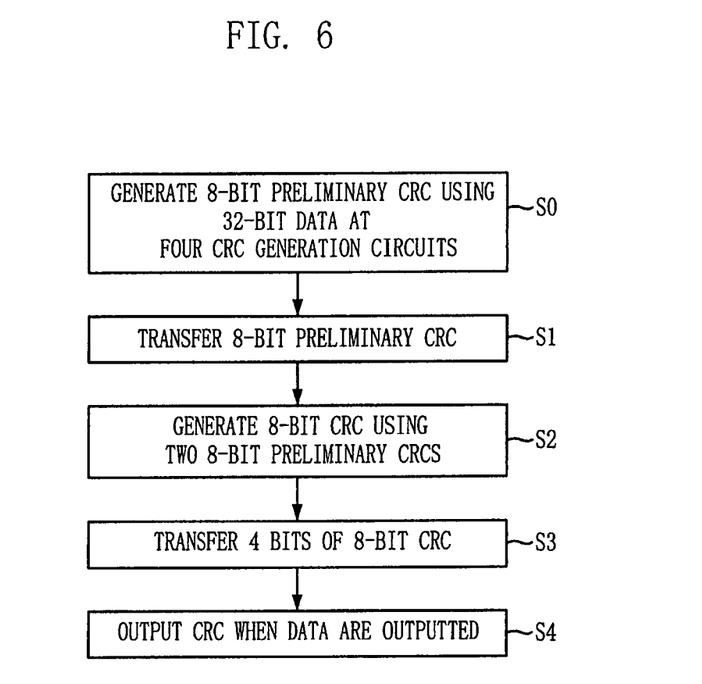
FIG. 6 is a flow diagram showing a process of generating a CRC in the semiconductor memory device of FIG. 4.

FIG. 6 is a flow diagram showing a process of generating the CRC in the semiconductor memory device of FIG. 4.

Referring to FIG. 6, in step S0, the first to fourth CRC generation circuits 30 to 60 receive 32-bit data from the two selected banks and generate 8-bit preliminary CRC, respectively. In step S1, the second CRC generation circuit 40 transfers the preliminary CRC to the fourth CRC generation circuit 60, and the third CRC generation circuit 50 transfers the preliminary CRC to the first CRC generation circuit 30. In step S2, the first CRC generation circuit 30 generates 8-bit CRC CRC_A using two 8-bit preliminary CRCs, and the fourth CRC generation circuit 60 generates 8-bit CRC CRC_B using two 8-bit preliminary CRCs. In step S3, the fourth CRC generation circuit 60 transfers 4-bit CRC C2 of the 8-bit CRC CRC_B to the first CRC generation circuit 30, and the first CRC generation circuit 30 transfers 4-bit CRC C1 of the 8-bit CRC CRC_A to the fourth CRC generation circuit 60. In step S4, the 4-bit CRC C0 generated by the first CRC generation circuit 30 is outputted through the first to fourth data input/output pads DQ0 to DQ3 after the data 0-31 are outputted. The 4-bit CRC C2 which is generated by the fourth CRC generation circuit 60 and transferred to the first CRC generation circuit 30 is outputted through the first to fourth data input/output pads DQ0 to DQ3 after the data 32-63 are outputted. The 4-bit CRC C1 which is generated by the fourth CRC generation circuit 60 and transferred to the first CRC generation circuit 30 is outputted through the first to fourth data input/output pads DQ0 to DQ3 after the data 64-95 are outputted. The 4-bit CRC C3 generated by the fourth CRC generation circuit 60 is outputted through the first to fourth data input/output pads DQ0 to DQ3 after the data 96-127 are outputted.

As described above, the semiconductor memory device operating in the X8 mode generates and outputs the 16-bit CRC during the operation of outputting the 128-bit data through the first to eighth data input/output pads DQ0 to DQ7. To this end, all of the first to fourth CRC generation circuits 30 to 60 are used.

However, as shown in FIG. 5, when the 64-bit data from the two banks are divided into 32-bit data and the 8-bit CRCs CRC_A and CRC_B are finally generated, a long delay time is required during the operation of generating the CRCS. In addition, as shown in FIG. 4, the first to fourth CRC generation circuits 30 to 60 are used for generating the CRCs.

That is, the 64-bit data 0-127 from the first and second banks B0 and B1 are inputted in groups of 32 bits, the 8-bit preliminary CRCs are generated to the adjacent CRC generation circuit, and the 8-bit preliminary CRCs are again transferred to the CRC generation circuit after the final CRCs are generated. Therefore, the CRCs are transferred two times. Consequently, a long delay time is required and four CRC generation circuits are required.

Because the semiconductor memory device operating in the X8 mode requires four CRC generation circuits, it cannot be used while sharing the CRC of the semiconductor memory device operating in the X4 mode. In general, the semiconductor memory device is manufactured such that it can support the X4 mode, the X8 mode, and the X16 mode and can operate in a specific operation mode according to an applied system. In the semiconductor memory device using the CRC, however, the number of CRC generation circuits required in the X8 mode and the X4 mode is different. Therefore, it is impossible to manufacture the semiconductor memory device operating in various modes.

Figure 7:
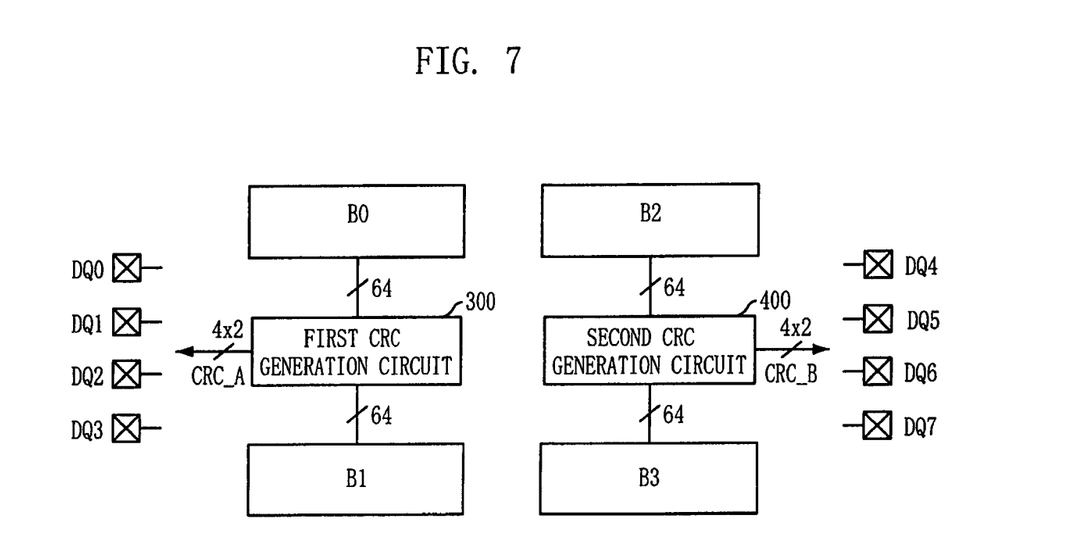
FIG. 7 is a block diagram of a semiconductor memory device in accordance with an embodiment of the present invention.

FIG. 7 is a block diagram of a semiconductor memory device in accordance with an embodiment of the present invention.

Referring to FIG. 7, the semiconductor memory device includes first to fourth banks B0 to B3. First to fourth data input/output pads DQ0 to DQ3 are disposed at one side of a region where the first to fourth banks B0 to B3 are arranged, and fifth to eighth data input/output pads DQ4 to DQ7 are disposed at the other side of the region where the first to fourth banks B0 to B3 are arranged.

The first to fourth data input/output pads DQ0 to DQ3 are provided for the data transfer during access to the data of first bank B0 or the second bank B1. The fifth to eighth data input/output pads DQ4 to DQ7 are provided for the data transfer during data to the data of the third bank B2 or the fourth bank B3. A first CRC generation circuit 300 is shared by the first bank B0 and the second bank B1. The first CRC generation circuit 300 generates a first CRC CRC_A using the output data of the first bank B0 or the second bank B1 and outputs the first CRC CRC_A through the first to fourth data input/output pads DQ0 to DQ3. A second CRC generation circuit 400 is shared by the third bank B2 and the fourth bank B3. The second CRC generation circuit 400 generates a second CRC CRC_B using the output data of the third bank B2 or the fourth bank B3 and outputs the second CRC CRC_B through the first to fourth data input/output pads DQ4 to DQ7.

The semiconductor memory device of FIG. 7 includes the eight data input/output pads so as to enable the X8 mode operation. The data input/output pads are disposed in groups of four at one side and the other side of the region where the banks so as to transfer the output data of the banks along the most optimal data path. In addition, by separately arranging the data input/output pads in groups of four, the distance from each bank to the data input/output pads can be maintained constantly.

Figure 8:
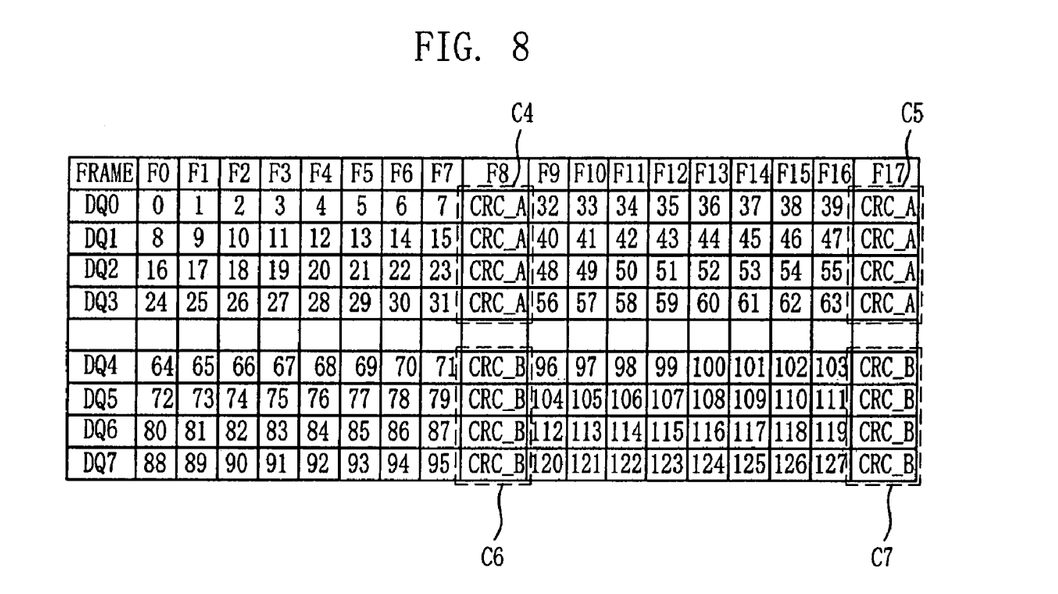
FIG. 8 is a diagram showing data patterns outputted from the semiconductor memory device of FIG. 7.

FIG. 8 is a diagram showing data patterns output from the semiconductor memory device of FIG. 7.

As shown in FIG. 8, assuming that the first and third banks B0 and B2 are selected, when data access command is inputted, 64-bit data 0-63 from the first bank B0 are outputted through the first to fourth data input/output pads DQ0 to DQ3, and 64-bit data 64-127 from the third bank B2 are outputted through the fifth to eighth data input/output pads DQ4 to DQ7.

The first CRC generation circuit 300 generates 8-bit first CRC CRC_A using 64-bit data output from the first bank B0. After data 0-31 are outputted, 4-bit CRC C4 of the 8-bit first CRC CRC_A is outputted through the first to fourth data input/output pads DQ0 to DQ3. After the data 32-63 are outputted, the remaining 4-bit CRC C5 is outputted through the first to fourth data input/output pads DQ0 to DQ3.

The second CRC generation circuit 400 generates 8-bit second CRC CRC_B using 64-bit data output from the second bank B2. After data 64-95 are outputted, 4-bit second CRC C6 of the 8-bit second CRC CRC_B is outputted through the fifth to eighth data input/output pads DQ4 to DQ7. After data 96-127 are outputted, the remaining 4-bit second CRC C7 is outputted through the fifth to eighth data input/output pads DQ4 to DQ7. The 32-bit data outputted at one time are grouped into two 16-bit data and outputted through the corresponding single data input/output pad.

Figure 9:
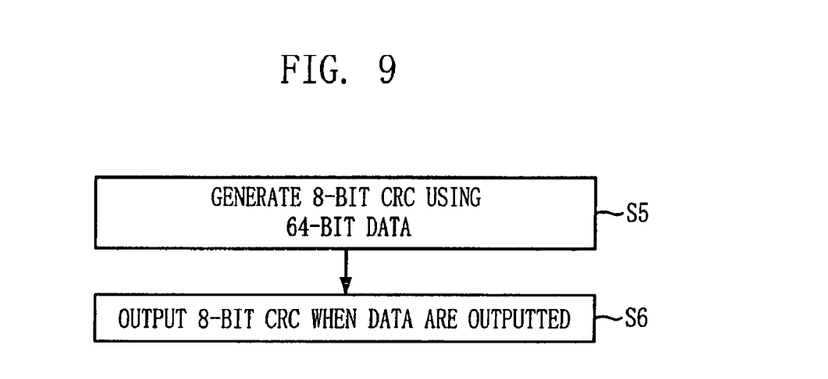
FIG. 9 is a flow diagram showing a process of generating a CRC in the semiconductor memory device of FIG. 7.

FIG. 9 is a flow diagram showing a process of generating the CRC in the semiconductor memory device of FIG. 7.

Referring to FIG. 9, in step S5, the first and second CRC generation circuits 300 and 400 receive the 64-bit data from the selected two banks and generate the 8-bit CRCs CRC_A and CRC_B, respectively. Then, the first CRC generation circuit 300 divides the 8-bit first CRC CRC_A into two 4-bit CRCs and outputs them through the first to fourth data input/output pads DQ0 to DQ3 after the 32-bit data are outputted. The second CRC generation circuit 400 divides the 8-bit second CRC CRC_B into two 4-bit CRCs and outputs them through the fifth to eighth data input/output pads DQ4 to DQ7 after the 32-bit data are outputted.

As described above, since the semiconductor memory device generates the 8-bit CRC using the 64-bit data output from the respective banks, the process of generating the CRC is very simple compared with the semiconductor memory device of FIG. 4. In addition, since the preliminary CRCs are not generated, time necessary to generate the CRCs can be significantly reduced.

Furthermore, the semiconductor memory device of FIG. 7 can operate in the X4 mode. The semiconductor memory devices in accordance with the embodiments of the present invention can input/output the 4-bit data in response to the one-time data access command at the same time. In this case, the data are transferred through the first to fourth data input/output pads DQ0 to DQ3 or the fifth to eighth data input/output pads DQ4 to DQ7.

That is, in case of the X4 mode operation, the first to fourth data input/output pads DQ0 to DQ3 or the fifth to eighth data input/output pads DQ4 to DQ7 are selected and the data are transferred therethrough. In this case, one of the four banks is selected when the data access command is inputted.

When the first bank B0 is selected, the 64-bit data are provided from the first bank B0 and are outputted through the first to fourth data input/output pads DQ0 to DQ3 or the fifth to eighth data input/output pads DQ4 to DQ7. The first CRC generation circuit 300 generates the 8-bit CRC using the 64-bit data provided from the first bank B0 and outputs it through the selected data input/output pads. When the second bank B1 is selected, the second CRC generation circuit 400 generates the 8-bit CRC using the 64-bit data provided from the second bank B2 and outputs it through the selected data input/output pads.

As described above, the semiconductor memory devices in accordance with the embodiments of the present invention can generate the CRC using two CRC generation circuits in both the X4 mode and the X8 mode. Therefore, the semiconductor memory device sharing the X4 mode and the X8 mode can be easily manufactured. In addition, since the process of generating the CRC in the X8 mode is very simplified, time necessary to generate the CRC can be remarkably reduced.

The semiconductor memory device can provide the CRC more efficiently. Further, it is possible to manufacture semiconductor memory devices operating in various modes, e.g., X4 mode and X8 mode.

While the present invention has been described with respect to the specific embodiments, it will be apparent to those skilled in the art that various changes and modifications may be made without departing from the spirit and scope of the invention as defined in the following claims.

What is claimed is:

1. A semiconductor memory device, comprising:
a first bank and a second bank;
one or more first data input/output pads disposed at one side of the first bank and used in access to data of the first bank;
one or more second data input/output pads disposed at one side of the second bank and used in access to data of the second bank;
a first cyclic redundancy code (CRC) generation circuit for generating a first CRC using a plurality of data output from the first bank and outputting the generated first CRC through the first data input/output pads; and
a second CRC generation circuit for generating a second CRC using a plurality of data output from the second bank and outputting the generated second CRC through the second data input/output pads.

2. The semiconductor memory device as recited in claim 1, wherein the first and second data input/output pads are arranged in groups of four, respectively, and the semiconductor memory device simultaneously inputs/outputs 8-bit data in response to one-time data access command.

3. The semiconductor memory device as recited in claim 2, wherein the semiconductor memory device inputs/outputs 64-bit data in groups of 16 bits in response to the one-time data access command through the first data input/output pads and the second data input/output pads, respectively.

4. The semiconductor memory device as recited in claim 1, further comprising a third bank and a fourth bank, wherein the first CRC generation circuit is shared by the first bank and the third bank, and the second CRC generation circuit is shared by the second bank and the fourth bank.

5. The semiconductor memory device as recited in claim 1, wherein the first data input/output pads and the second data input/output pads are arranged in groups of four, respectively, and the semiconductor memory device simultaneously inputs/outputs 4-bit data through the first data input/output pads or the second data input/output pads in response to one-time data access command.

6. The semiconductor memory device as recited in claim 5, wherein, in an operation mode where 4-bit data are accessed in response to the one-time data access command, the first CRC and the second CRC are outputted through the first data input/output pads or the second data input/output pads, which are selected for transferring the data.

7. A method for driving a semiconductor memory device having a first bank and a second bank, data of the first bank being accessed through one or more first data input/output pads disposed at one side of the first bank, data of the second bank being accessed through one or more second data input/output pads disposed at one side of the second bank, the method comprising:
generating a first CRC using first data provided from the first bank;
generating a second CRC using second data provided from the second bank;
outputting the first data through the first data input/output pads in response to a data access command;

outputting the first CRC through the first data input/output pads;
outputting the second data through the second data input/output pads in response to the data access command; and
outputting the second CRC through the second data input/output pads.

8. The method as recited in claim 7, wherein the semiconductor memory device simultaneously inputs/outputs 8-bit data in response to the one-time data access command.

9. The method as recited in claim 8, wherein the semiconductor memory device inputs/outputs 64-bit data in groups of 16 bits in response to the one-time data access command through the first data input/output pads and the second data input/output pads, respectively.

10. The method as recited in claim 8, wherein the semiconductor memory device simultaneously inputs/outputs 4-bit data through the first data input/output pads or the second data input/output pads in response to the one-time data access command.

11. The method as recited in claim 10, wherein, in an operation mode where 4-bit data are accessed in response to the one-time data access command, the first CRC and the second CRC are outputted through the first data input/output pads or the second data input/output pads, which are selected for transferring the data.

* * * * *